(12) United States Patent
Libchaber

(10) Patent No.: US 8,054,793 B2
(45) Date of Patent: Nov. 8, 2011

(54) EQUIPMENT AND METHOD FOR IMPROVING WORLDWIDE INTEROPERABILITY FOR MICROWAVE ACCESS (WIMAX) NETWORK CAPACITY

(75) Inventor: Jacques Libchaber, Nozay (FR)

(73) Assignee: Alcatel Lucent, Paris (FR)

( * ) Notice: Subject to any disclaimer, the term of this patent is extended or adjusted under 35 U.S.C. 154(b) by 523 days.

(21) Appl. No.: 12/328,609

(22) Filed: Dec. 4, 2008

(65) Prior Publication Data

US 2009/0154414 A1 Jun. 18, 2009

(30) Foreign Application Priority Data

Dec. 6, 2007 (EP) .................................... 07291463

(51) Int. Cl.
*H04W 4/00* (2009.01)
*H04W 72/00* (2009.01)
*H04J 1/00* (2006.01)

(52) U.S. Cl. ........ 370/329; 370/338; 370/341; 370/343; 455/450

(58) Field of Classification Search .......... 370/310–350; 455/446–464
See application file for complete search history.

(56) References Cited

U.S. PATENT DOCUMENTS

| 7,548,507 B2 * | 6/2009 | Pandoh et al. ................. 370/208 |
| 7,764,658 B2 * | 7/2010 | Garrett et al. ................. 370/336 |
| 2010/0254342 A1 * | 10/2010 | Cho et al. ...................... 370/330 |
| 2010/0260079 A1 * | 10/2010 | Baldemair et al. ............ 370/280 |

\* cited by examiner

*Primary Examiner* — Tri H Phan
(74) *Attorney, Agent, or Firm* — Fay Sharpe LLP

(57) ABSTRACT

The invention relates to a Worldwide Interoperability for Microwave Access (WIMAX) network comprising at least one base station and at least one terminal. Said at least one base station, to send a signal to said at least one terminal, is able to split said signal into a plurality of WIMAX signals and send simultaneously said WIMAX signals through a plurality of channels with different frequency frames and wherein said at least one terminal is able to receive and process simultaneously said plurality of WIMAX signals.

10 Claims, 3 Drawing Sheets

US 8,054,793 B2

EQUIPMENT AND METHOD FOR IMPROVING WORLDWIDE INTEROPERABILITY FOR MICROWAVE ACCESS (WIMAX) NETWORK CAPACITY

BACKGROUND OF THE INVENTION

The present invention relates to the field of wireless communication system, and more particularly to Worldwide Interoperability for Microwave Access (WIMAX) network.

A WIMAX network is a wireless digital communication system providing broadband wireless access (BWA). A WIMAX network comprises two core components: a base station (BS) and a mobile subscriber station (MSS) or terminal. A base station and one or more terminals can form a cell with a point to multi-point (P2MP) structure. On air, the base station controls activity within the cell, including access to the medium by any terminal, allocations to achieve quality of service (QoS), and admission to the network based on network security mechanisms. Multiple base stations can be configured to form a cellular wireless network. The cell radius in a WIMAX cellular network can be a few miles so that WIMAX technology allows larger distance transmissions as well as higher bit rates than WIFI technology. Nevertheless, bit rate needs are always bigger and solutions to cope with the increase of network traffic will have to be found. Assuming that technological progress will provide base stations and terminals with higher processing power, the problem will be to adapt these enhanced base stations and terminals with already existing WIMAX network infrastructure (access and core) to provide WIMAX networks with improved performances.

It is an object of the present invention to provide an overall WIMAX network with improved performances.

SUMMARY OF THE INVENTION

One object of the present invention is to provide a solution for improving WIMAX network performances in the future.

This improvement is achieved by a Worldwide Interoperability for Microwave Access (WIMAX) network comprising at least one base station and at least one terminal. Said at least one base station, to send a signal to said at least one terminal, is able to split said signal into a plurality of WIMAX signals and send simultaneously said WIMAX signals through a plurality of channels with different frequency frames and wherein said at least one terminal is able to receive and process simultaneously said plurality of WIMAX signals.

Moreover, said at least one terminal, to send a signal to said at least one base station, is able to split said signal into a plurality of WIMAX signals and send simultaneously said WIMAX signals through a plurality of channels with different frequency frames and wherein said at least one base station is able to receive and process simultaneously said plurality of WIMAX signals.

Preferably, WIMAX signals comprise signals with WIMAX standard framing.

Advantageously, processing simultaneously said WIMAX signals comprises recombining said plurality of WIMAX signals to rebuild the original signal.

Alternatively, said at least one terminal is mobile.

Preferably, each frequency frame is 10 Mhz wide.

Advantageously, said base station emits WIMAX signals with different frequencies in different sectors.

Alternatively, the frequency reuse for the network is 3.

Preferably, said base stations and terminals comprise rejection filters for avoiding interferences between channels.

Moreover, method for improving Worldwide Interoperability for Microwave Access (WIMAX) network capacity wherein to send a signal from one source transceiver to a destination transceiver, said method comprises splitting said signal into a plurality of WIMAX signals, sending said signal from said source transceiver through a plurality of channels with different frequency frames, receiving said plurality of WIMAX signals by the destination transceiver and processing said plurality of WIMAX signals to recombine the original signal from said plurality of WIMAX signals.

DETAILED DESCRIPTION OF THE INVENTION

As used herein, the term "transceivers" refers to equipment able to transmit and receive signals.

As used herein, the term "terminals" stands for network equipment comprising at least one transceiver.

Figure 2:
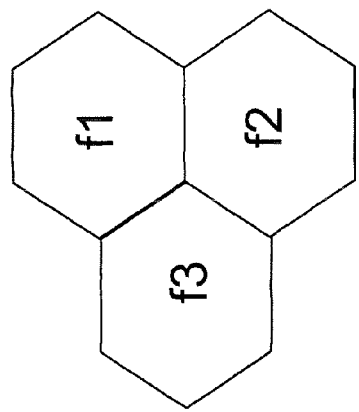
FIG. 2 is a diagram of a framing of a WIMAX signal according to the present invention.
Figure 1:
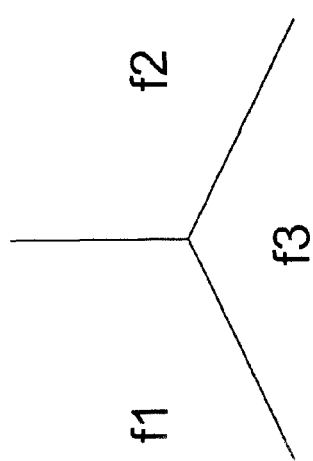
FIG. 1 is a diagram of a framing of a WIMAX signal according to the state of the art.

WIMAX network communications are based on the exchange of data between base stations and terminals. In the state of the art, each base can emit and receive signals in different sectors and each sector has its own frequency channel. FIG. 1 illustrates a base station comprising three sectors. Base stations can be arranged to create a basic structure or cell as illustrated on FIG. 2. In this case the cell is composed of three hexagons. The network is created by the replication of this basic structure or cell. The number of different frequencies required to have a satisfactory radio coverage of the basic structure or cell defines the frequency reuse of the network. In the cell presented on FIG. 2, three different frequencies are needed, therefore the frequency reuse of the corresponding network is 3.

Exchanged data between base stations and terminals are sent over the air through these frequency channels. Each frequency channel having a given bandwidth and comprising a given number of free running frequencies or sub-carriers, for example 1024 free running frequencies over a 10 MHz bandwidth. Free running frequencies are equally spaced over the channel bandwidth. Orthogonal frequency division multiplexing (OFDM) technology is used to allow transmission of the sub-carriers without interferences.

Figure 5:
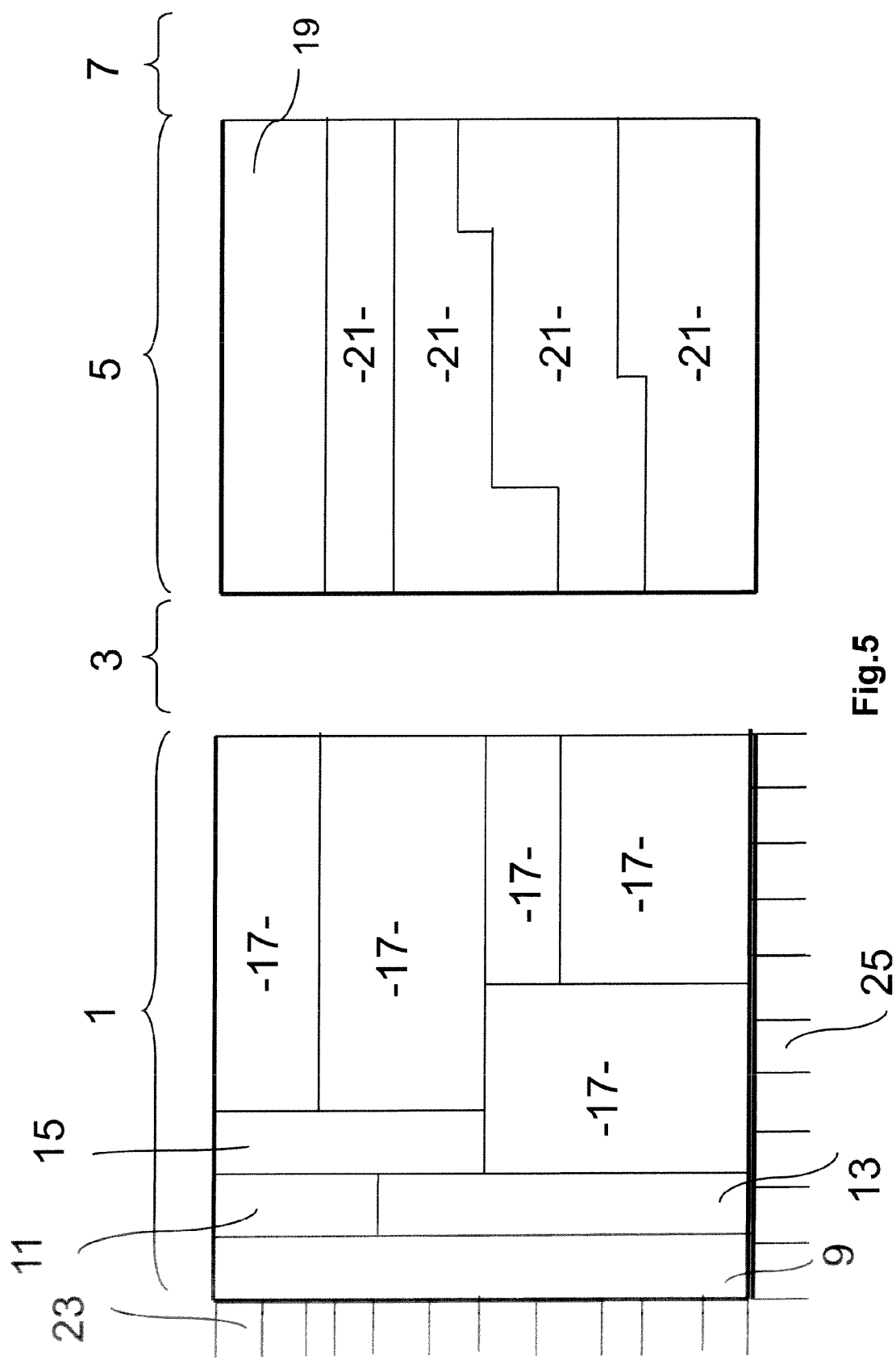
FIG. 5 is a diagram of a trisectored WIMAX base station according to the present invention.

Data transmission is performed on a frame-by-frame basis. FIG. 5 illustrates such data organization. Each frame is divided into a downlink (DL) data transmission sub-frame 1 and an uplink (UL) data transmission sub-frame 5 separated by a transmit transition gap (TTG) 3. A receive transition gap (RTG) 7 is positioned after the UL sub-frame. Both DL and UL sub-frames are configured in a two-dimensional arrangement of frequency domain with respect to the time domain. Each frame can be divided in frequency units 23 and time units 25. The DL sub-frame comprises a preamble 9 which is a synchronization signal for synchronization acquisition between a BS and terminals, a frame control header (FCH) 11, a DL map 13, the first DL burst 15 carrying the UL map and a plurality of DL bursts 17. The UL sub-frame comprises a ranging sub-channel 19 and a plurality of UL burst 21.

Figure 4:
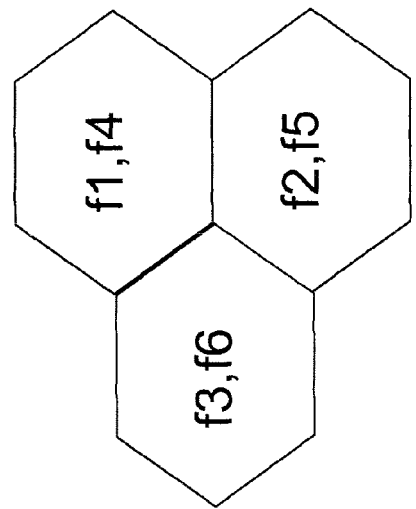
FIG. 4 is a diagram of a cellular network equipped with trisectored WIMAX base stations according to the state of the art.
Figure 3:
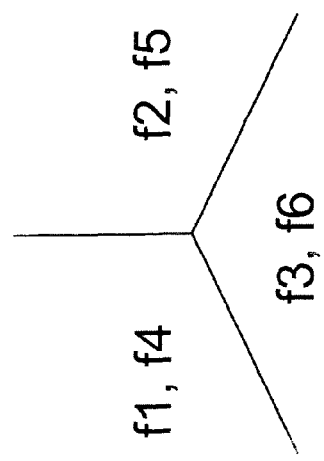
FIG. 3 is a diagram of a trisectored WIMAX base station according to the state of the art.
Figure 6:
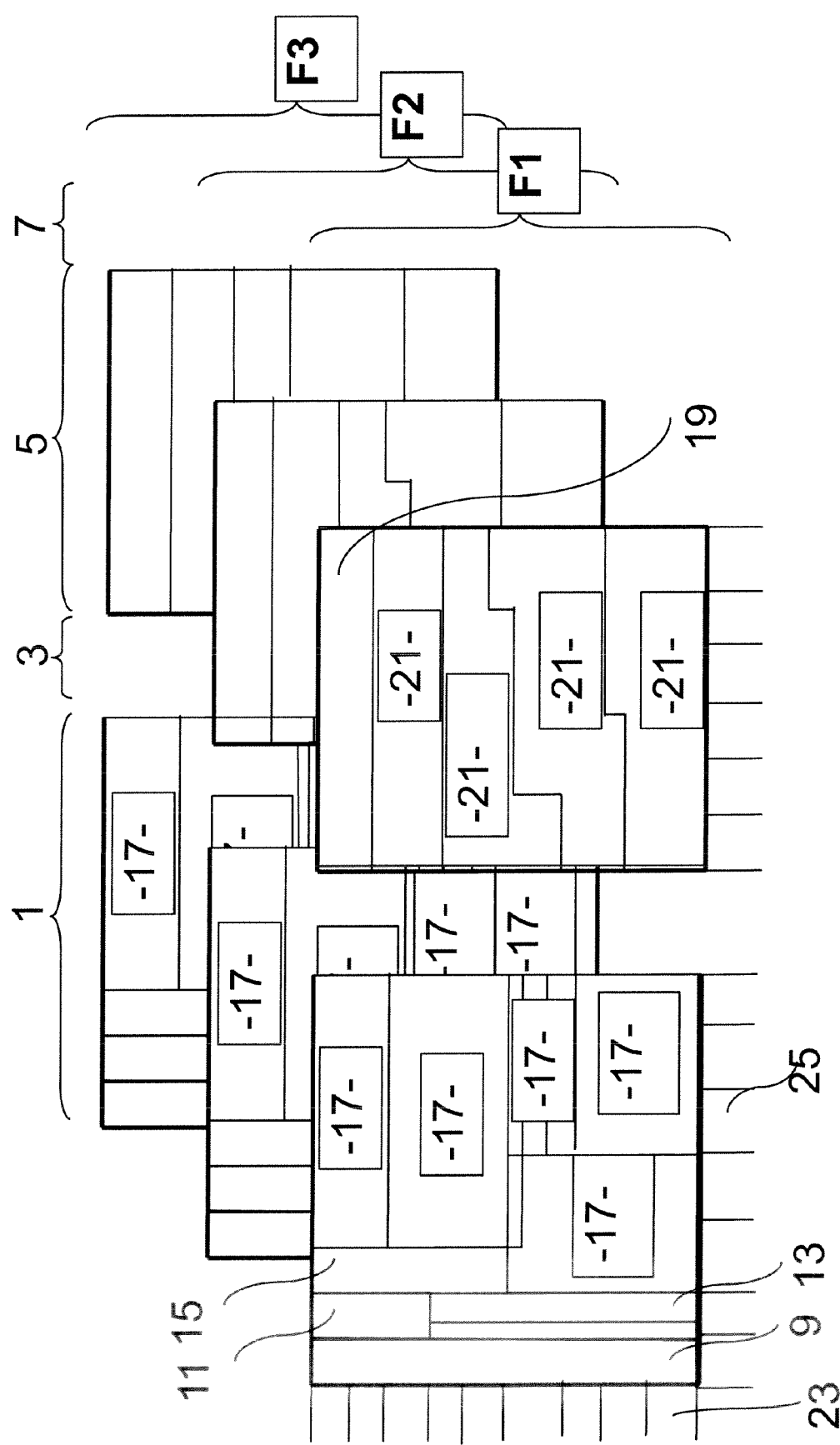
FIG. 6 is a diagram of a cellular network equipped with trisectored WIMAX base stations according to the present invention.

In the future, with technology improvements, the processing power of base stations and terminals will be increased. The idea is then to use this amount of power to increase the bit rate exchanges and the traffic capacity of the network without changing the whole network structure. The present invention offers to solve this problem by increasing the number of channels in each sector and therefore each cell. A base station will therefore be able to emit on different channels. FIG. 3 and FIG. 4 illustrate respectively a trisectored base station and a cell comprising six different frequency channels in each cell. The number of frequency channels is limited only by the processing power of the base station and the terminals. Each terminal will appear as several "old" terminals and be able to receive and emit signals on several channels. Traffic will therefore be multiplied by the number of channels. Data organization will be the same as previously but several frames will be emit and receive at the same time on different frequency channels. FIG. 6 represents such data organization with three frequency channels (f1, f2, f3). A signal needed to be sent from a base station to a terminal and requiring a large bandwidth will then be split into several signals, said signals will be sent through different frequency channels. The terminal will receive and process the different signals to recreate the original signal.

Thus, "new" base stations and terminals will allow higher bit rate transmissions without changing the whole network architecture so that "old" and "new" terminals will be usable at the same time in the same network.

What is claimed is:

1. Worldwide Interoperability for Microwave Access (WIMAX) network comprising at least one base station and at least one terminal wherein said at least one base station, to send a signal to said at least one terminal, is able to split said signal into a plurality of WIMAX signals and send simultaneously said WIMAX signals through a plurality of channels with different frequency frames and wherein said at least one terminal is able to receive and process simultaneously said plurality of WIMAX signals.

2. Worldwide Interoperability for Microwave Access (WIMAX) network in accordance with claim 1 wherein said at least one terminal, to send a signal to said at least one base station, is able to split said signal into a plurality of WIMAX signals and send simultaneously said WIMAX signals through a plurality of channels with different frequency frames and wherein said at least one base station is able to receive and process simultaneously said plurality of WIMAX signals.

3. Worldwide Interoperability for Microwave Access (WIMAX) network in accordance with claim 1 wherein WIMAX signals comprise signals with WIMAX standard framing.

4. Worldwide Interoperability for Microwave Access (WIMAX) network in accordance with claim 1 wherein processing simultaneously said WIMAX signals comprises recombining said plurality of WIMAX signals to rebuild the original signal.

5. Worldwide Interoperability for Microwave Access (WIMAX) network in accordance with claim 1 wherein said at least one terminal is mobile.

6. Worldwide Interoperability for Microwave Access (WIMAX) network in accordance with claim 1 wherein each frequency frame is 10 Mhz wide.

7. Worldwide Interoperability for Microwave Access (WIMAX) network in accordance with claim 1 wherein said base station emits WIMAX signals with different frequencies in different sectors.

8. Worldwide Interoperability for Microwave Access (WIMAX) network in accordance with claim 7 wherein the frequency reuse for the network is 3.

9. Worldwide Interoperability for Microwave Access (WIMAX) network in accordance with claim 1 wherein said base stations and terminals comprise rejection filters for avoiding interferences between channels.

10. Method for improving Worldwide Interoperability for Microwave Access (WIMAX) network capacity wherein to send a signal from one source transceiver to a destination transceiver, said method comprises splitting said signal into a plurality of WIMAX signals, sending said signal from said source transceiver through a plurality of channels with different frequency frames, receiving said plurality of WIMAX signals by the destination transceiver and processing said plurality of WIMAX signals to recombine the original signal from said plurality of WIMAX signals.

* * * * *